United States Patent
Abboud et al.

(10) Patent No.: US 6,898,705 B2
(45) Date of Patent: May 24, 2005

(54) AUTOMATIC APPLIANCE SERVER RE-PROVISION/RE-PURPOSING METHOD

(75) Inventors: Akram Abboud, Durham, NC (US); John Michael Brantly, Raleigh, NC (US); William W. Buchanan, Jr., Wake Forest, NC (US); Peter Gerard Chin, Raleigh, NC (US); Simon Chu, Chapel Hill, NC (US); Richard Alan Dayan, Wake Forest, NC (US); Peter Thomas Donovan, Apex, NC (US); David Michael Green, Hillsborough, NC (US); Timothy J. Green, Hillsborough, NC (US); Thomas William Lange, Cary, NC (US); Gregory Brian Pruett, Raleigh, NC (US); Karl Ross Shultz, Cary, NC (US); Paul Brian Tippett, Durham, NC (US); Andrew Hamilton Wray, Hillsborough, NC (US); William Paul Zeggert, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 09/870,916

(22) Filed: May 31, 2001

(65) Prior Publication Data

US 2002/0184484 A1 Dec. 5, 2002

(51) Int. Cl.[7] .............................................. G06F 9/445
(52) U.S. Cl. ................... 713/100; 713/1; 713/2; 713/100; 717/175; 717/176; 711/173; 714/3; 714/5; 714/6; 714/8; 709/215; 709/221
(58) Field of Search ................. 713/1, 2, 100; 717/175, 176; 711/173; 714/3, 5, 6, 8; 709/215, 221

(56) References Cited

U.S. PATENT DOCUMENTS

| | | | | |
|---|---|---|---|---|
| 5,136,711 A | * | 8/1992 | Hugard et al. | 713/2 |
| 5,579,522 A | * | 11/1996 | Christeson et al. | 713/2 |
| 5,764,992 A | * | 6/1998 | Kullick et al. | 717/170 |
| 5,787,491 A | * | 7/1998 | Merkin et al. | 711/173 |
| 5,790,852 A | * | 8/1998 | Salm | 718/104 |
| 5,819,030 A | | 10/1998 | Chen | 709/220 |
| 5,870,550 A | | 2/1999 | Wesinger et al. | 709/218 |
| 5,901,148 A | | 5/1999 | Bowen et al. | 709/203 |
| 6,157,934 A | | 12/2000 | Khan et al. | 709/203 |
| 6,199,033 B1 | | 3/2001 | Tanaka | 709/226 |
| 6,308,265 B1 | * | 10/2001 | Miller | 713/2 |
| 6,453,413 B1 | * | 9/2002 | Chen et al. | 713/2 |
| 6,591,376 B1 | * | 7/2003 | VanRooven et al. | 714/36 |
| 6,594,757 B1 | * | 7/2003 | Martinez | 713/2 |
| 6,601,212 B1 | * | 7/2003 | Guha et al. | 714/776 |
| 2002/0049966 A1 | * | 4/2002 | Lin | 717/178 |
| 2002/0095672 A1 | * | 7/2002 | Evans et al. | 717/175 |
| 2002/0103981 A1 | * | 8/2002 | Smith et al. | 711/162 |

* cited by examiner

Primary Examiner—John R. Cottingham
Assistant Examiner—Nitin C. Patel
(74) Attorney, Agent, or Firm—Martin J. McKinley; Dillon & Yudell LLP (57) ABSTRACT

Disclosed is a method for automatically re-provisioning an appliance server without significant user-interaction. The disk drive of a server to be utilized as an appliance server is partitioned into at least three partitions, including a systems partition, a network operating system partition, and an images partition. A re-provisioning utility is provided, which, when activated by a user, removes the present application from the server and forwards it to a storage location on the network or in a fourth storage partition and installs another application on the server. The system is re-booted and re-configured to provide full operation of the new application.

27 Claims, 7 Drawing Sheets

Fig. 7

AUTOMATIC APPLIANCE SERVER RE-PROVISION/RE-PURPOSING METHOD

RELATED APPLICATIONS

The present invention is related to the subject matter of U.S. patent application Ser. No. 09/907,075 entitled "An Appliance Server With a Drive Partitioning Scheme That Accommodates Application Growth in Size" filed concurrently herewith.

BACKGROUND OF THE INVENTION

1. Technical Field

The present invention relates to data processing systems and in particular to servers that are utilized to host applications. Still more particularly, the present invention relates to a method, system, and program product for extending server appliance functionality to allow automatic re-provisioning of the server appliance.

2. Description of the Related Art

Many businesses are capitalizing on the marketing potential of the quickly expanding Internet by providing web sites that are accessible to users on the Internet. Most of these business, however, do not have the funding, expertise, or desire to purchase required hardware and software and to set-up and maintain these web sites. These businesses typically turn to companies, such as Internet Service Providers (ISPs) that provide hosting capabilities along with the required technical expertise and equipment to host the business' applications.

Web hosting, as the process is called, typically utilizes a server or group of servers (commonly referred to within the industry as a server farm), which host software applications that provide the particular service of the server owner or business. Most businesses utilize the ISP to provide and support their specific Internet applications on a server, which is owned by the ISP. The applications are typically stored on a CD-ROM and manually installed on the server by ISP personnel.

Figure 2:
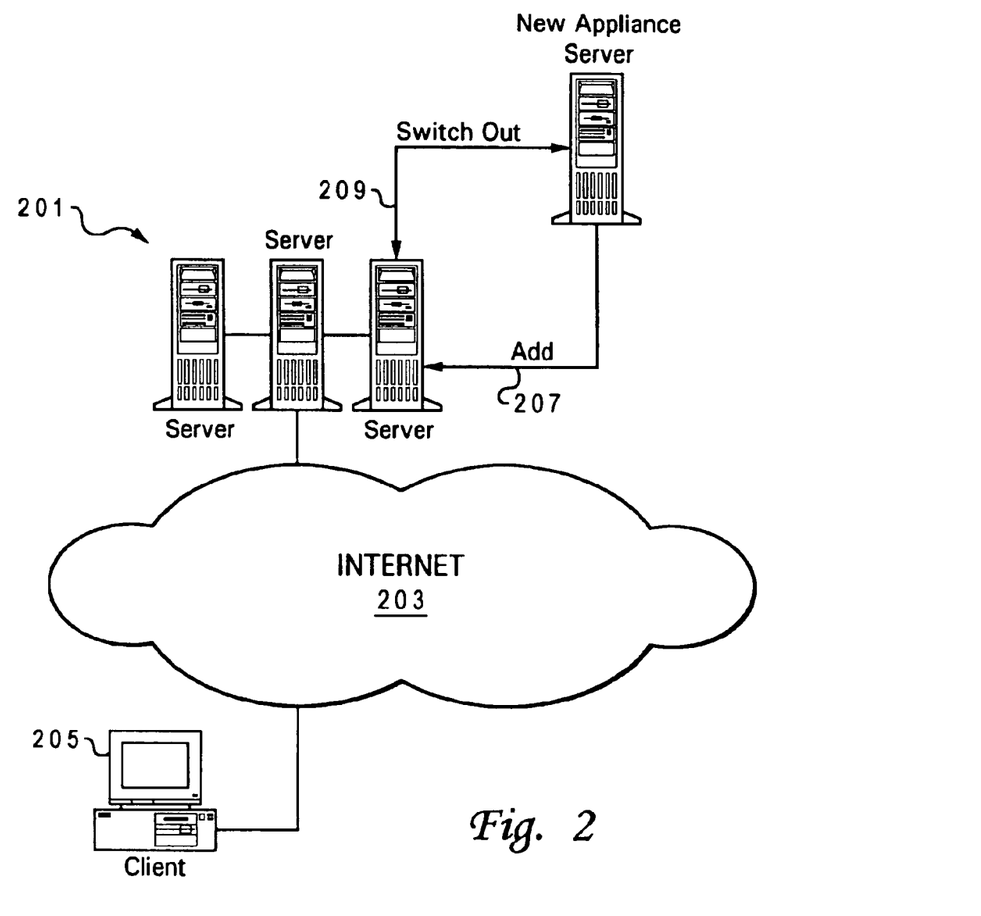
FIG. 2 is a block diagram of a server farm connected to the Internet.

FIG. 2 illustrates a server farm connected to the Internet. Server farm 201 comprises three servers, each hosting a business application (or appliance). Server farm is connected to Internet 203. Also connected to Internet 203 is client system 205, which may be utilized to access the Internet 203 and browse or interact with the application hosted by one or more of the servers in server farm 201.

ISPs typically provide a separate server or group of servers for each business application being hosted. Multiple servers (or server groups) with different applications are controlled by an ISP and make up the sever farm which is "plugged" into the Internet. Each server, including its affiliated software and applications, are extremely costly to acquire, and thus, ISPs seek to provide efficient utilization of the limited number of available servers.

Internet dynamics and user demands often requires an ISP to provide access to different applications and purposes from among a number of possible applications and purposes at scheduled times or on user-demand. The traditional way to handle this requirement is to laboriously install more servers on the racks with the desired application(s) and then configure the servers to meet the demand or to switch out one of the servers with another server that has the desired application loaded on it (see arrow path 207 and 209 of FIG. 2). This proves to be rather costly and time consuming.

Appliance servers are standard severs that operate a specific application via a specific operating system (OS), (i.e., single-focused servers or server groups), and are typically installed for one purpose at an ISP/ASP server farm. Occasionally, an application running on a particular server is desired to be (temporarily) replaced by another application. This may be due to a need to run the other application when all available servers are already being utilized (i.e., there are less available servers than the number of applications desired to be hosted). Whenever the application being run on the appliance server is no longer desired or is being replaced, the ISP personnel has to manually remove the server from the rack (or shelf), un-install the current application, install the next application, and re-configure and re-boot the server before placing the server back on the shelf. The steps of manually changing or installing an appliance server results in significant time loss and may also result in the appliance sever being temporarily unavailable to users desiring to connect to the server.

Occasionally, some ISPs maintain a bank of small personal computer (PC) servers. If the capacity of the server farm is exceeded, the provider adds an additional PC server at minimal expense compared to purchasing a high end server. Thus, hardware scalability is fairly easy to manage compared to the high end server systems. However, like the high end server systems, software scalability is not easily accomplished. In order to update the software in the server farm, each system to be updated must be taken offline, reformatted, re-partitioned, and then loaded manually. This is laborious and very time consuming. In addition, the existing OS's are stuck with working with a physical hard drive that contains a maximum of four in-flexible partitions due to compatibility and the present PC operating system's configuration. With a manual re-provisioning process, if the new application size exceeds the pre-allocated hard disk partition or space allocated for re-provisioning, the re-provisioning process cannot be completed and a new server is required.

The present invention recognizes that it would be desirable to have a method and system for automatically re-provisioning/re-purposing an appliance server to provide a different application and/or appliance responsive to a schedule or to user-demand. A method and system that automatically re-configures a server with a new or different application without requiring significant user manipulation (or interaction) would be a welcomed improvement. These and other benefits are provided by the present invention.

The present invention recognizes that it would be desirable to have a method and system for automatically re-provisioning/re-purposing an appliance server to provide a different application and/or appliance. A method and system that automatically re-configures a server with a new or different application and that provides a dynamic hard disk partition scheme that allows the dynamic adjusting of the partition size of a hard disk during a re-provisioning/re-purposing process to accommodate the variable sizes of new applications. These and other benefits are provided by the present invention.

SUMMARY OF THE INVENTION

Disclosed is a method for automatically re-provisioning an appliance server without significant user-interaction. The disk drive of a server to be utilized as an appliance server is partitioned into at least three partitions, including a system partition, a network operating system (NOS) partition, and an images partition. A re-provisioning utility is provided, which, when activated by a user, removes a first application (appliance) from the NOS partition of the server and forwards it to a storage location on the network or in a storage partition of the local disk. The re-provisioning utility further installs a second application on the server from the images partition. The system is automatically re-booted and re-configured to provide full operation of the second application.

The system partition contains the system's operating system. The images partition contains an image file of the second application, which may comprise the application code and associated operating system, etc. (e.g., the network operating system (NOS) for normal operation of the server during web-hosting). The first application may be removed along with its associated operating system. The re-provisioning utility wraps/packages the first application along with its associated files and operating system into a single image file, which is then compressed and forwarded to a storage location. The image file thus comprises the application program(s) and the systems ID, IP address, etc. Additionally, each appliance is provided with a unique ID to allow independent utilization of the appliance across multiple server systems. The storage location may be the images partition or a networked location that is accessible via file transfer protocol (ftp).

The second application may be stored on images partition during initial configuration of the server or later received from a networked site via ftp. The second application is then automatically installed over the current operating system or with another associated operating system. To install the image file, the file is first uncompressed and unpackaged and then an install executable is initiated by the re-provisioning utility. The second application is thus automatically installed on the NOS partition.

In one preferred embodiment, prior to the re-provisioning operations (i.e., create image, apply image, etc.), the re-provisioning utility combines the system's parameters, i.e., system ID, IP address, etc., in a file that is stored in the images partition that may be accessed later to re-activate the system's network functions. After re-provisioning, the system parameters are restored or ("re-installed") to provide similar operational and connection features to the original settings of the server.

In another preferred embodiment, the hard disk of the server is partitioned with a float (or empty) partition between the NOS partition and the images partition. The disk drive controller is provided software code that allows dynamic extension/expansion of the respective sizes of the NOS and/or the images partition into the logical space of the float partition whenever the size of the new application or the size of the image file of the new application exceeds the partitioned size of the NOS partition and the images partition, respectively. The variable partition topology and the determination of the needed sizes for the new application and image file are programmed into the re-provisioning utility, which messages the disk drive controller to implement the adjusting of the partition spaces. A flexible hard-drive partition topology is therefore enabled.

In one embodiment, user activation of the re-provisioning utility involves utilization of a user interface associated with the re-provisioning utility. The scripts may be provide within a GUI or as a text based interactive process. Thus, the appliance server's application is conveniently changed by a short series of computer clicks or text-based user input.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
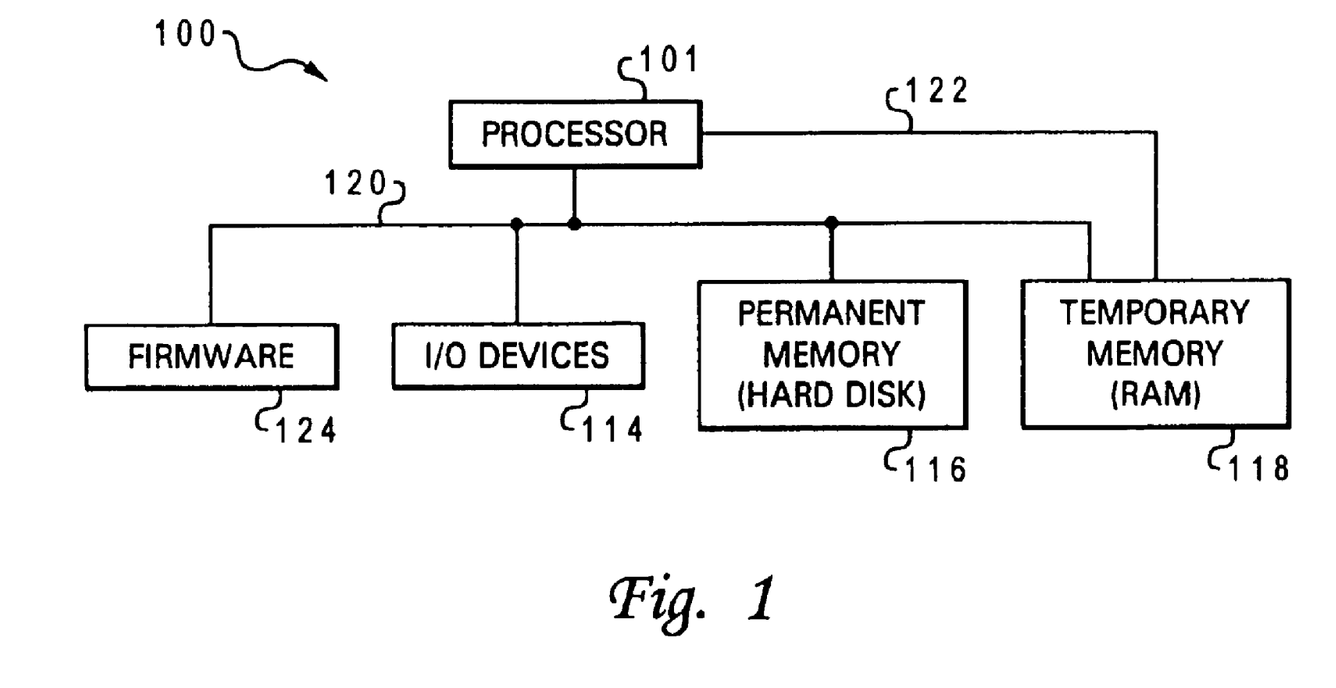
FIG. 1 is a block diagram of a data processing system that may be utilized as a server appliance in one embodiment of the present invention.

With reference now to the figures and in particular with reference to FIG. 1, there is illustrated a block diagram of the basic structure of a data processing system 100 that may be utilized in the preferred embodiment of the invention. Data processing system 100 has at least one central processing unit (CPU) or processor 101 which is connected to several peripheral devices including input/output devices 114 for user interface. Other peripheral devices includes a non-volatile (or permanent) memory 116 (such as a hard disk) for storing the data processing system's operating system and user programs/applications, and a temporary memory device 118 (such as random access memory (RAM)) that is utilized by processor 101 while executing program instructions. In the preferred embodiment, non-volatile memory 116 is partitioned to support the functional features of the invention, which are described in detail below. Processor 101 communicates with the peripheral devices by various means, including a bus 120 or a direct channel 122.

Those skilled in the art will further appreciate that there are other components that might be utilized in conjunction with those shown in the block diagram of FIG. 1; for example, a display adapter connected to processor 101 might be utilized to control a video display monitor, and a memory controller may be utilized as an interface between temporary memory device 118 and processor 101. Data processing system 100 also includes firmware 124 whose primary purpose is to seek out and load an operating system from one of the peripherals (usually permanent memory device 116) whenever the data processing system 100 is first turned on. Data processing system 100 may also include a modem or network adapter by which remote access is provided and data processing system is networked. In the preferred embodiment, data processing system 100 also contains program code (i.e., a re-provisioning utility) that enables switching of appliance-based applications and operating modes and re-configuring of data processing system 100 to support specific applications. The preferred embodiment further assumes that data processing system 100 has a relatively fast processor 10 along with sufficient disk space on temporary memory device 118 and on permanent memory device 116, and other hardware components necessary for providing the functional elements of the invention.

The present invention provides a method and system that enables an automatic re-provision and/or re-purposing of an appliance server. According to a preferred embodiment, an appliance server automatically re-provisions/re-purposes itself to run a different application with very little input required by the server personnel (typically IT personnel) or user. The invention operates to change the appliance server's disk image to another image that may include a different operating system. A created image file may include the OS and application and the image file is transferred to local storage or another storage location on a network. Further, the invention may be simultaneously extended to a large number of appliance servers. Utilization of the features of the invention allows re-usability of servers by re-provision/re-purposing of the sever to a needed application or purpose based on a schedule or user-demand with very little human intervention. This functionality results in a great economic advantage due to reduced hardware costs and hours spent on manual re-configuring, etc.

A key dependency of the implementation of the re-provisioning feature of the invention is providing a known appliance drive partition layout. The drive is formatted to include a series of congruent, logical partitions. The preferred embodiment of the invention is implemented within the limit imposed by legacy compatibility of three (3) primary partitions and one (1) or data partition on a disk. Each appliance has a systems partition and an images partition in addition to the needed partitions for the operating system (OS) to work as normal.

Figure 3A:
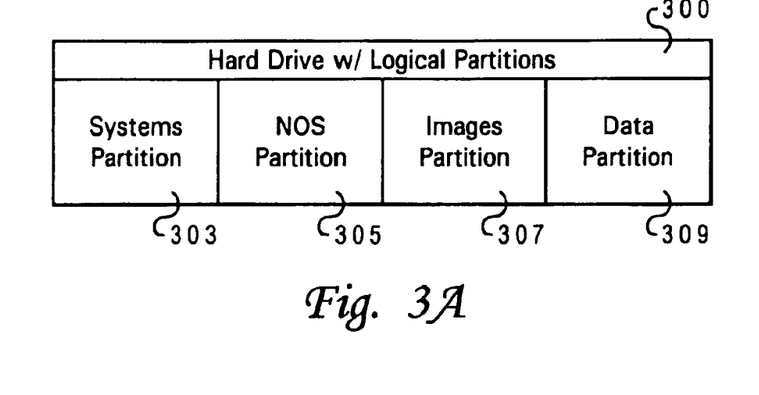
FIG. 3A is a block diagram of the component parts of a partitioned server as utilized to implement a preferred embodiment of the invention.

Referring now to FIG. 3A, an appliance server's hard disk is illustrated partitioned into four partitions (i.e., logical drives), including system partition 303, network operating systems (NOS) partition 305, and images partition 307. A fourth partition, the temporary storage or data partition 309 is also provided. The system partition 303 basically comprises an operating system (OS), such as DOS or Linux.

The system partition 303 exhibits the characteristics of a bootable partition on a hard drive that allows the user to perform disk imaging operations. Thus, in the preferred embodiment, the system partition 303 is hidden and set inactive during normal appliance operation, and the system partition 303 is only un-hidden and set active when a re-provisioning operation is triggered to occur. The system partition 303 contains the system's operating system. The images partition 307 contains an image file of a second application, which may comprise the application code and associated operating system, etc. (e.g., the network operating system (NOS) for normal operation of the server during web-hosting).

Creation of the partitions is undertaken at the manufacturing stage of the appliance server, and the system OS powers up the system and keeps it running. The network parameters (i.e., including name, path, userid, password, directory, etc.) are also set up at system set-up time to allow access to remote file systems. The server boots to the OS, and the system partition 303 is hidden. The NOS partitions 305 and images partition 307 are un-hidden. Re-provision images are transferred via a file transfer utility such as, for example, file transfer protocol (FTP) and stored as a file in the images partition 307 by a re-provisioning utility. The re-provisioning utility automatically sets network settings for a new image. When a re-provisioning operation is desired to be performed, the system partition 303 is set to be the active partition, the partition type of the system partition 303 is changed to normal, non-hidden OS, and the systems partition 303 is then re-booted into the system's OS (e.g., DOS or Linux). Prior to re-provisioning, the network setting is stored as a file in images partition 307 and after re-provisioning, the network and system information are restored into the new OS. After the system boots and the images restoration is complete, the re-provisioning utility sets the NOS partition 305 as the active partition, and a utility edits the partition table to switch the systems partition 303 back to hidden. Then, the appliance re-boots from the NOS partition 305.

Each server group (or farm) has an associated remote storage utilized to save re-provision images, and the operation of the invention requires that an FTP server be configured and present. The remote storage together with an FTP Username/Password pair and directory name of where the images should be stored is preferably specified during creation (and configuration) of the server group. References to FTP in the present invention is provided solely for illustrative purposes and any other type of file transfer mechanism that stores and retrieves files to and from a remote location and the server is permitted within the scope of the invention.

The image file contains the application program(s) and the systems ID, IP address, etc. Additionally, each appliance is provided a unique ID or file name. The image file name utilized in the preferred embodiment includes the model number and serial number of the appliance server. The re-provisioning utility concatenates these numbers and links the concatenated result to the image file as an identifier of the image file. This naming process allows each image file name to be unique, and thus, the server is able to store many different image files on to an FTP site. In the partitioned disk, the data partition 309 is utilized to store a factory image, which includes the default settings and the OS and installation parameters of the appliance server. These parameters are preferably installed during manufacturing of the appliance server. The data partition 309 thus operates as a recovery CD/disk medium.

When the re-provisioning operation occurs, the server is restarted and the system boots to the operating system on the system partition 303. Then, after the imaging operation is completed, the systems partition 303 is set hidden by its executable programs, and the NOS partition 305 is set active again. Following, the server re-boots into the OS for normal appliance operation.

The images partition 307 is also similar to a systems partition, but is utilized to store images provided from file transfer protocol (FTP) transfer of images as described below. According to the preferred implementation, the images partition 307 is un-hidden because re-provisioning disk images and some other re-provisioning files are stored there during normal appliance operation. In the embodiment illustrated in FIG. 3A, systems partition 303 is the first partition on the disk, and images partition 307 is the 3rd. The NOS (e.g., Linux, Windows, etc.) is installed on the second partition (NOS) partition 305, and all other information (e.g., data, linux swap, etc.) are placed in logical drives in data partition 307.

In one embodiment, the logical position of the fourth and third partitions are reversed. The data partition 309 has a set size and is placed in the fixed size area previously held by the images partition 307. Consequently the images partition 307 is moved to the fourth logical area, where it is provided additional storage capacity for stored image files, whose sizes may be variable. Those skilled in the art will appreciate that the order of the partitions are not necessarily fixed and may be changed depending on the characteristics of the particular system.

Dynamically Variable Hard Disk Partition Sizes

Figure 3B:
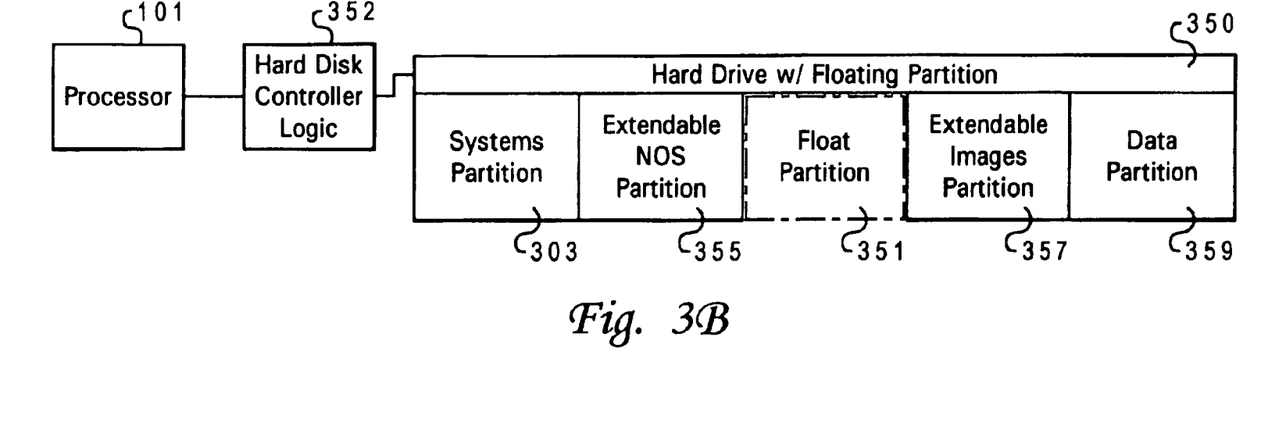
FIG. 3B is a block diagram of the component parts of a partitioned server with flexible partition sizes according to a preferred embodiment of the invention.

One embodiment of the invention provides a variable or expandable functionality to the partitions of the hard disk, namely the NOS partition and the images partition. FIG. 3B illustrates the new hard disk partition topology according to the preferred embodiment. As shown, expandable NOS partition 355 and expandable image partition 357 are separated by a float partition 359. Preferably, the float partition 359 includes sufficient space for growth of the current NOS partition 355 and the expandable image partition 357, while supporting the storage of the factory images, etc. As illustrated, disk drive controller 352 is coupled to hard disk 350 and contains logic (hardware and/or software) that is controlled by the re-provisioning utility to provide the functional features of an adjustable disk partitioning scheme. Thus, in the preferred embodiment, the re-provisioning utility is extended to include program code for completing the functional steps illustrated below in FIG. 7 by communicating with the processor 101 and hard disk controller 352.

An example of a hard disk with adjustable partitions is now presented. For the example, it is assumed that the hard disk has 8 Megabytes (MB) of disk space and that the hard disk is partitioned as follows: 1.5:2.5:1:2:1 representing, in order, the disk sizes for system, expandable NOS, float, expandable images, and data partitions. When an additional 0.5 MB of memory is required to install the new application, the upper, logical address boundary of the NOS partition 355 is moved into the float partition space, and the new partition configuration becomes 1.5:3.0:0.5:2:1. If the image file also requires 0.25 MB of additional memory space, the partition configuration becomes 1.5:3.0:0.25:2.25:1, and so on. The logical boundaries of each partition represents memory addresses that the processor is made aware of in order to correctly access (e.g., store and read) the data within each partition.

Figure 7:
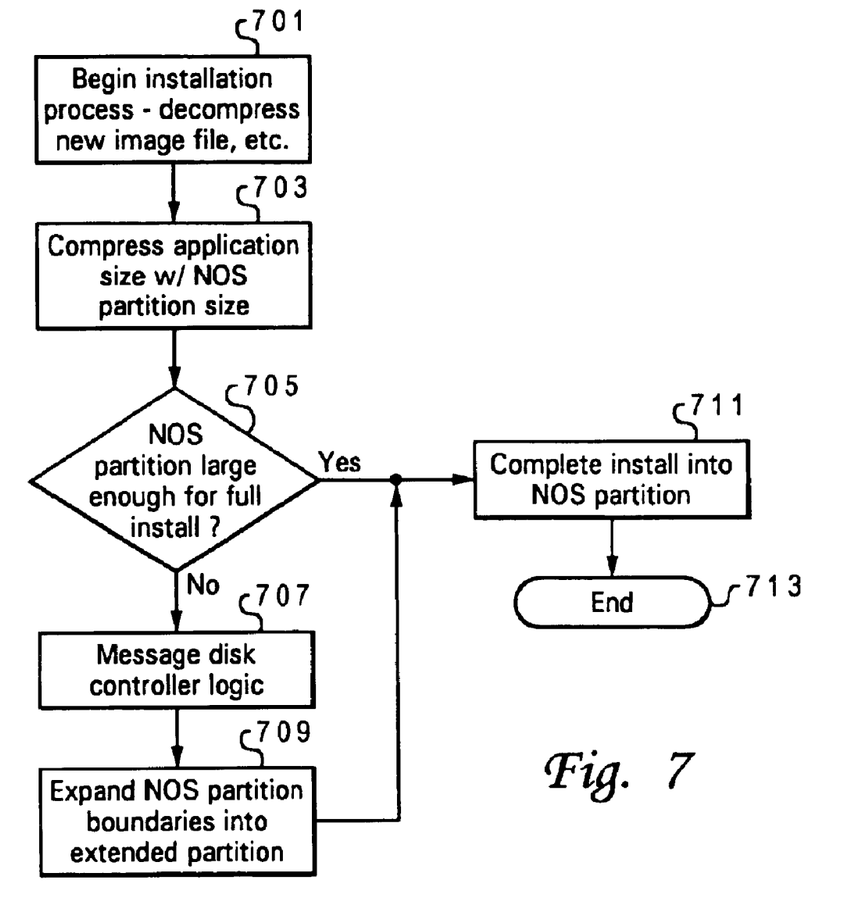
FIG. 7 is a flow chart illustrating the process of dynamically expanding NOS and/or images partition according to a preferred embodiment of the invention.

FIG. 7 illustrates the process by which a dynamically adjustable partition scheme may be implemented. When the new partition image is being de-compressed and the new application is about to be installed, the required disk space for the new application is read from the image file's parameters as shown at block 701 and a determination made at block 703 whether the required space for correct installation and execution of the new application exceeds the pre-allocated space of the current (or previous) partition image. If the new application requires a larger (or additional) disk space, the preferred embodiment of the invention dynamically expands the available disk space of the expandable NOS partition 355 into the float partition 351 as illustrated at block 709. To complete this process, the re-partitioning utility compares the available size (provided during initial formatting of the drive) with the required size read from the image file and messages the disk controller to "move" the logical address boundary for the NOS partition to a specific memory address/location to accommodate the application as shown at block 707. The NOS logical boundary is thus moved to incorporate some (or all) of the float partition space thus expanding the NOS partition 355 into the float partition 351 to provide sufficient space for the decompressed image file to be installed and executed as shown at block 711. In the preferred embodiment, the re-provisioning utility checks for the usage of and space availability in the adjustable float partition 351 before performing partition enlargement in order to avoid erasure of data or overlapping of memory space allocated to different processes/applications. Notably, the re-partitioning utility (or processor) may first re-locate data (e.g., factory images, etc.) that exists within the float partition 351 to the latter physical addresses of the partition prior to extending the NOS partition 355. The process then ends at block 713.

In a related embodiment, when the new image file is retrieved from the network, the expandable image partition 357 may be enlarged into the disk space of the adjustable float partition 359 to accommodate the new image file. Accordingly, the content of the process steps illustrated in FIG. 7 may be amended to recite image file and images partition in place of new application and NOS partition, respectively.

Operation of Re-Provisioning Utility (Create Image, Apply Image, Restore Settings)

The invention is an executable program that operates via software coded blocks, collectively referred to as a re-provisioning utility, which undertakes the various re-provisioning functions. In the preferred embodiment, the utility calls a series of program subroutines, which perform the operating system functions needed to create and restore images. Specifically, the subroutines provide the functionality required for transferring files, calling utilities to create images or apply images, and setting partitions to active and in-active. The subroutines further support restore operations from factory settings. These subroutines operate along with the special disk partitioning scheme that is required on the server appliance.

The re-provisioning utility provides a series of independent functions executed by program code, which are inter-linked by a control program. Thus, in the preferred embodiment, re-provisioning utility comprises create images utility, apply images utility, and restore settings utility. Create and Apply images utility further comprises or is associated with program code for controlling FTP accesses required to transfer and receive image files to and from the network, respectively.

When an image file is desired to be created, the application is removed along with its associated operating system. The re-provisioning utility wraps/packages the application along with its associated files and operating system into a single file, which is then compressed and forwarded to a storage location. The storage location may be the images partition or a networked location that is accessible via file transfer protocol.

In order to provide a second application on the server, an image file of the second application is stored within the images partition 307 during initial configuration of the server or later received from a networked site via FTP. The image file is first uncompressed and unpackaged and then the re-provisioning utility executes an install executable. The second application is thus installed on the NOS partition. The second application may be installed over the present operating system or along with its own operating system.

The re-provisioning utility automatically sets network settings for new images on the system, which is called by the OS of systems partition 303. In one embodiment, prior to the start of the re-provisioning operation, the re-provisioning utility places the system's network settings/parameters (e.g., system ID, IP address, etc.) in a file that is forwarded to the images partition, from where it may later be accessed to restore the system parameters after the re-provisioning process is completed. The system's parameters may therefore be "re-installed" to provide similar operational and connection features to the original settings on the server, settings are stored as a file in the images partition 307. Thus, after re-provisioning, the network and systems information/settings are conveniently restored.

Figure 4A:
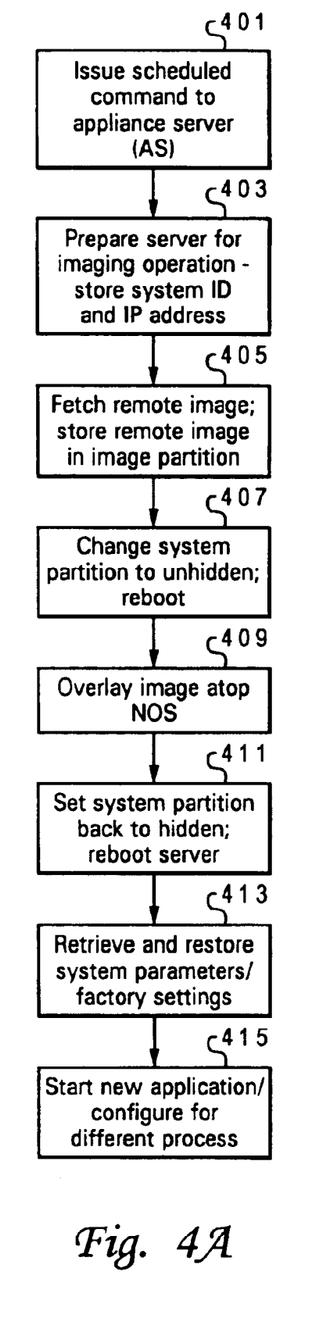
FIGS. 4A–4B are flow charts of the processes of automatically re-provisioning a server appliance in accordance with preferred embodiments of the invention.
Figure 4B:
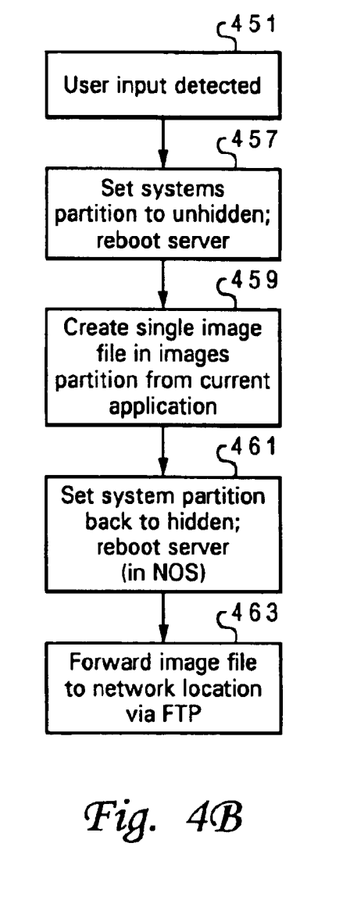

FIGS. 4A–4B illustrates general processes by which various stages of the re-provisioning function is completed. Specifically, FIG. 4A illustrates the process by which the apply images utility provides a new application to a server and the factory images are restored. According to FIG. 4A, a scheduled command is issued to an appliance server as shown at block 401. Then, the re-provisioning utility prepares the server for an imaging operation by storing away system ID and IP address information, etc. in a file in the images partition 307 as shown as block 403. The server, while running on NOS application fetches a remote image and stores it in the images partition 307 as illustrated at block 405. The process by which this is completed includes going out on the network to an FTP site, obtaining the image file via FTP, and storing the image file in the images partition. Following, the re-provisioning utility changes the systems partition 303 from hidden to un-hidden and re-boots as shown at block 407.

The system partition 303 overlays the image atop NOS partition as shown at block 409, and then the system partition 303 is the set back to hidden and the server is re-booted as depicted at block 411. Following the reboot, the system ID, IP address, and other parameters are retrieved from storage and the system's factory images are restored as shown at block 413. When the server re-boots, the new application is initiated as shown at block 415. According to the preferred embodiment, the same command may be sent to a large number of servers simultaneously to further multiply the efficiency of this method. Notably, if the system partition 303 is set un-hidden when the server re-boots, the boot sequence is controlled from the system partition 303; otherwise the NOS is utilized to execute the boot sequence.

FIG. 4B illustrates the process by which the create images utility provides an image file. The process begins when a user input is detected as shown at block 451. Following, the system partition 303 is set to hidden and the server is re-booted as shown at block 457. Following, the re-provisioning utility packages the current application from the NOS along with its operating system into a single image file a shown at block 459. The single image file is compressed and stored in the images partition 307. The system partition 303 is then set back to hidden and the server rebooted as shown at block 461. Finally, the image file is transferred to a network storage location via FTP as shown at block 463. In one embodiment, no local storage of the image file is required, and the image file is transferred directly to the network storage location.

Figure 5:
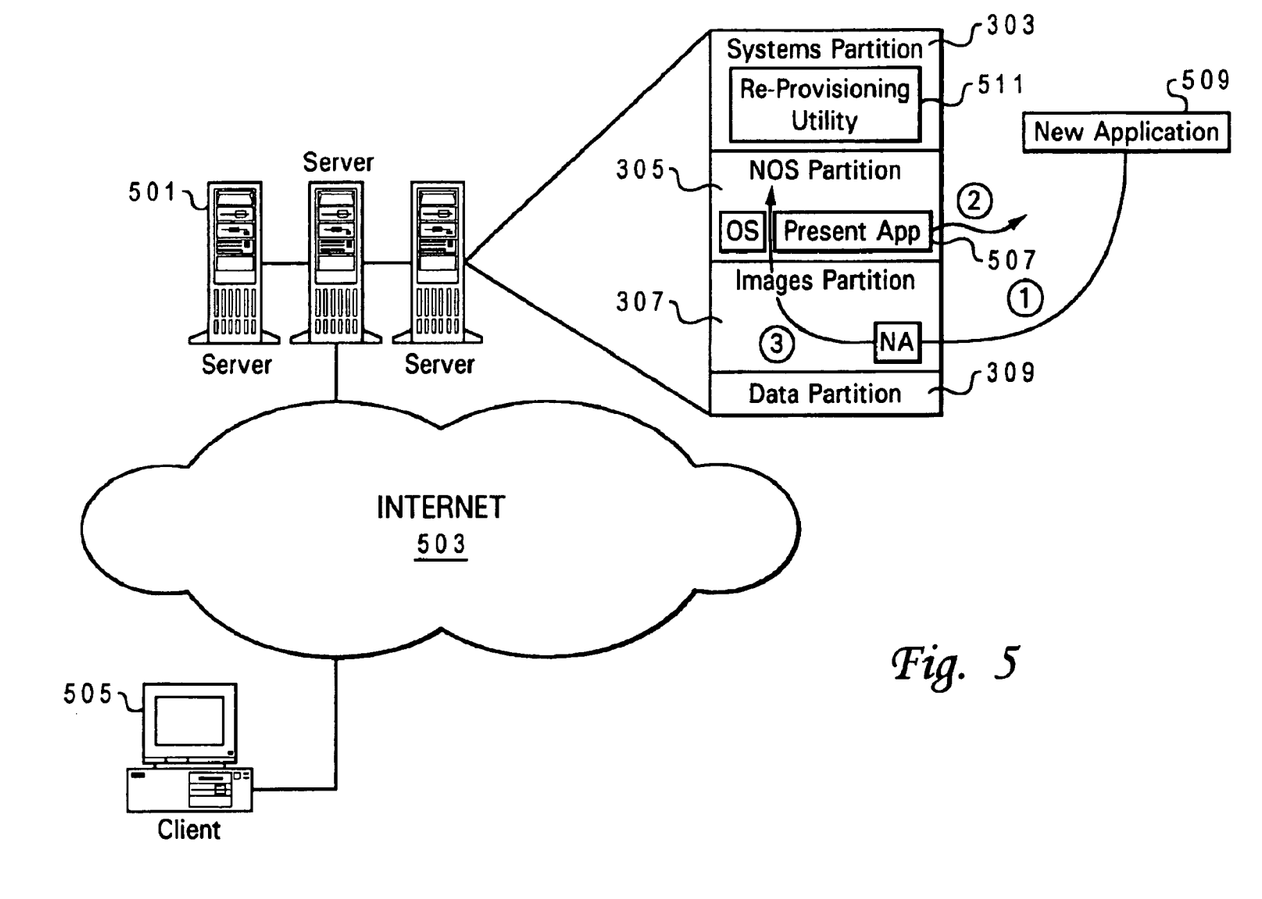
FIG. 5 is a block diagram of a server farm with partitioned servers utilized to perform automatic re-provisioning according to one embodiment of the present invention.

FIG. 5 illustrates an appliance server system with automatic re-provisioning functionality as provided by the present invention. Appliance server rack 501 is connected to Internet 503 and may be accessed by client system 505 via Internet 503. Appliance server rack 501 comprises several appliance servers, one of which is illustrated with drive partitions 303–309. First application 507 contained in NOS partition 305 may be replaced with second (new) application 509. During normal operation, the application that is currently in NOS partition 305 determines the functionality of the appliance server. Re-provisioning involves the removal of the first application 507 (as well as the associated OS) from the NOS partition 305 and subsequent loading of the second application 509 into NOS partition 305. Second application 509 may exist in local storage (i.e., images partition 307) or at an appliance storage location on the network. Accordingly a list of available, downloaded (via FTP) appliance images may be provided at a location on the network that is accessible to the ISPs upon request via FTP.

One feature of the invention is that when the partitioned servers are stacked on the server rack 501, there is no requirement for a mouse, keyboard or console, because all access to the appliance server(s) may be provided via the network. This further reduces costs associated with providing multiple server appliances.

In one illustrative embodiment, a user interface is utilized to receive the small number of user inputs and provide feedback to the user. In this embodiment, a re-provision image is created and represented on the user interface, which may be invoked from an appliance menu list available on the server or by right clicking an appliance icon. The user interface provides instructional help to guide the user through a series of dialog boxes to create a re-provision image. Each dialog box contains selectable buttons, which guide the user through the possible re-provisioning options. Alternatively, in another embodiment, user interaction is provided as textual (script) commands and arguments. Also, the commands to create and restore images may be issued remotely, thus eliminating the need for a user interface or textual selection.

Figure 6:
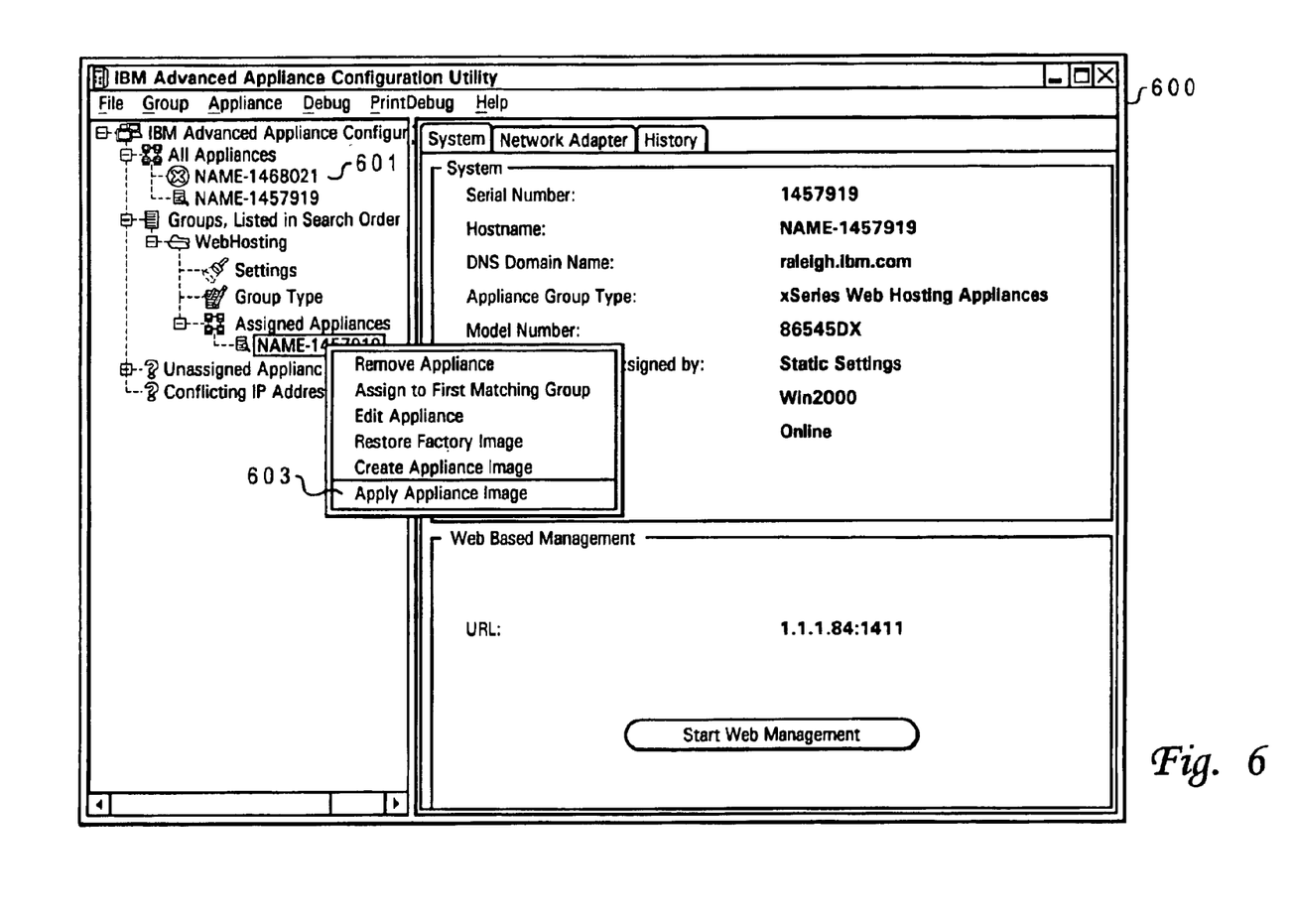
FIG. 6 is a block diagram illustrating an appliance server console or graphical user interface (GUI) for user-interaction and error notification in accordance with one embodiment of the invention.

FIG. 6 illustrates an appliance server console or user interface 600 by which a user/sever personnel is able to initiate the automatic re-provisioning operation on the server. As shown, user interface 600 includes a display of available applications 601 and a selection of available options 603 to initiate various re-provisioning features executed via the re-provisioning utility. In order to accept a request from a user and perform a re-provisioning operation for the selected appliance server, the user interface 600 accepts user input (mouse-clicks, keyboard input, etc.) and communicates the request to the console agent of the selected appliance server. The agent accepts the re-provision request, performs the necessary re-provisioning functions utilizing the re-provisioning utilities outlined above, and then messages the result back to the user. The features illustrated in FIG. 6 are provided solely for illustrative purpose and are not meant to be limiting on the invention.

According to the preferred embodiment, whenever an image is restored, only the NOS partition is re-written. The appliance server attempts to create a remote image name and sends a Create Image command to the server appliance. When the server receives a positive acknowledgment from the appliance agent, the user is prompted that a Create Image operation is underway. Subsequent imaging commands are then disabled for this appliance. Following, the user receives an acknowledgment of the success or failure of the operation.

When the image file is created and the appliance re-boots, the re-provisioning utility transfers the image file to a remote storage location/device via FTP or stores the image file in the images partition. The results of the FTP operation are conveyed to the server. The server interprets the receipt of the message to mean that the create operation is completed and cancels the timeouts, allow further imaging commands.

The server further changes the properties of the appliance to indicate that imaging is not in progress.

When the server receives a positive acknowledgment, the user interface changes properties value of the server appliance to indicate that an Apply Image operation is underway. Subsequent imaging commands are then disabled for the server appliance.

Error Capture

The invention further provides error reporting for re-provisioning operations. A log file is maintained so that if there is a failure during the re-provisioning operation (e.g., the operation "times out"), the customer is able to view the log file, if so desired, in order to debug the problem. In the event of corruption of the content of a partition or a program file, a recovery CD may be utilized to restore the factory default settings. In one embodiment, the log file contains an entry for each step of the re-provisioning operation, which displays (1) the Status/Error code that may be mapped to verbose status/error NLS messages, (2) the Date/Time, and (3) Coded status/error messages.

While an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analog communication links.

Also, while the invention has been particularly shown and described with reference to a preferred embodiment, it will be understood by those skilled in the art that various changes in form and detail may be made therein without departing from the spirit and scope of the invention.

What is claimed is:

1. A method of providing automatic re-provisioning of an appliance server comprising:
   removing a first application from a first partition of a partitioned hard-drive;
   dynamically loading a second application into said first partition, and
   automatically re-configuring said appliance server to operate said second application.

2. The method of claim 1, wherein said removing step includes:
   creating an image file of said first application along with an associated operating system and network parameters;
   assigning a unique identifier to said image file; and
   storing said image file of said first application.

3. The method of claim 2, further comprising:
   creating a parameter file of said network parameters including a system ID and IP address; and
   storing said parameter file of network parameters.

4. The method of claim 1, wherein said appliance server is connected to a network and said removing step removes said image file of said first application to a storage location on said network.

5. The method of claim 4, wherein said loading step first downloads said second application stored as an image file at a storage location on said network.

6. The method of claim 5, wherein said appliance server comprises a partitioned hard-drive having at least a system partition, a network operating system (NOS) partition, and an images partition, wherein said first partition is said NOS partition and said second partition is said images partition, said method further comprising:
   first setting said systems partition to un-hidden;
   responsive to a completion of said setting step, re-booting said server appliance utilizing a system's operating system(OS) contained in said system's partition;
   automatically installing said second application into said NOS partition;
   responsive to a completion of said installing step, setting said systems partition back to hidden; and
   rebooting said server appliance utilizing NOS.

7. The method of claim 6, further comprising restoring said network parameters to said appliance server following said rebooting utilizing NOS to enable said appliance server to operate via its correct network settings.

8. The method of claim 6, wherein said hard drive includes a float partition, wherein, responsive to a determination that said NOS partition is not sufficiently large to hold said second application, said method includes automatically expanding said NOS partition into a drive space of said float partition.

9. The method of claim 8, wherein, responsive to a determination that said images partition is not sufficiently large to hold said image file of said second application, said method includes expanding said images partition into a drive space of said float partition.

10. A computer program product comprising:
    a computer readable medium; and
    program code on said computer readable medium that enables automatic re-provisioning of an appliance server, said program code comprising code for:
       removing a first application from a first partition of a partitioned hard-drive;
       dynamically loading a second application into said first partition; and
       automatically re-configuring said appliance server to operate said second application.

11. The computer program product of claim 10, wherein said removing program code includes code for:
    creating an image file of said first application along with an associated operating system and network parameters;
    assigning a unique identifier to said image file; and
    storing said image file of said first application.

12. The computer program product of claim 11, further comprising program code for:
    creating a parameter file of said network parameters including a system ID and IP address; and
    storing said parameter file of network parameters.

13. The computer program product of claim 10, wherein said appliance server is connected to a network and said removing program code includes code for removing said image file of said first application to a storage location on said network via file transfer protocol (FTP).

14. The computer program product of claim 13, wherein said loading program code first downloads said second application as an image file from a storage location on said network.

15. The computer program code of claim 14, wherein said appliance server comprises a partitioned hard-drive having at least a system partition, a network operating system (NOS) partition, and an images partition, wherein said first partition is said NOS partition and said second partition is said images partition, said program code further comprising code for:

first setting said systems partition to un-hidden;

responsive to a completion of said setting step, re-booting said server appliance utilizing a system's operating system(OS) contained in said system's partition;

automatically installing said second application into said NOS partition;

responsive to a completion of said installing step, setting said systems partition back to hidden; and rebooting said server appliance utilizing NOS.

16. The computer program product of claim 15, further comprising code for restoring said network parameters to said appliance server following said rebooting utilizing NOS to enable said appliance server to operate via its correct network settings.

17. The computer program product of claim 15, wherein said hard drive includes a float partition, wherein, responsive to a determination that said NOS partition is not sufficiently large to hold said second application, said program code includes code for expanding said NOS partition into a drive space of said float partition.

18. The computer program product of claim 17, wherein, responsive to a determination that said images partition is not sufficiently large to hold said image file of said second application, said program code includes code for expanding said images partition into a drive space of said float partition.

19. An appliance server comprising:

a processor;

a hard disk that is partitioned into at least three partitions;

an operating system stored on a first one of said partitions;

an application program stored on a second one of said partitions and executed by said processor;

a re-provisioning utility executed by said processor that, when activated, dynamically installs a second application program on said second partition and automatically re-configures said appliance server to support said second application program.

20. The appliance server of claim 19, wherein further said re-provisioning utility automatically removes said application program from the second one of said partitions prior to installing said second application.

21. The appliance server of claim 20, wherein said re-provisioning utility comprises program code for:

creating an image file from said application program;

applying a stored image file corresponding to said second application on to said first partition; and subsequent to applying said stored image file, restoring factory network settings for said appliance server.

22. The appliance server of claim 21, wherein first partition is a network operating system (NOS) partition, said second partition is an images partition, wherein:

said bard drive further comprises a system partition; and said re-provisioning utility includes program code for selectively setting said system partition to hidden and un-hidden to allow a re-configuration of said appliance server.

23. The appliance server of claim 22, wherein said re-provisioning utility includes program code to reboot said appliance server during said re-provisioning operation.

24. The appliance server of claim 23, further comprising network connectivity that connects said appliance server to a network and allows transfer of image files to and from said network.

25. A network comprising:

network accessible storage locations;

file transfer protocol backbone; and an appliance server that comprises a hard disk that is partitioned into at least three partitions, having;

an operating system stored on a first one of said partitions;

an application program stored on a second one of said partitions and executed by said processor; and a re-provisioning utility that, when activated, dynamically installs a second application program on said second partition and re-configures said appliance server to support said second application program.

26. The network of claim 25, wherein further said re-provisioning utility automatically removes said application program from the second one of said partitions prior to installing said second application.

27. The network of claim 26, wherein said re-provisioning utility comprises:

program code for creating an image file from said application program, applying a stored image file corresponding to said second application on to said first partition, and subsequent to applying said stored image file, restoring factory network settings for said appliance server, and program code for selectively setting said system partition to hidden and un-hidden to allow a re-configuration of said appliance server.

* * * * *